(12) United States Patent
Matsumuro et al.

(10) Patent No.: US 10,442,915 B2
(45) Date of Patent: Oct. 15, 2019

(54) RUBBER COMPOSITION FOR CONVEYOR BELT, AND CONVEYOR BELT

(71) Applicant: BRIDGESTONE CORPORATION, Chuo-ku, Tokyo (JP)

(72) Inventors: Yasuhiko Matsumuro, Tokyo (JP); Toshihiko Kurata, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/514,887

(22) PCT Filed: Oct. 5, 2015

(86) PCT No.: PCT/JP2015/005058
§ 371 (c)(1),
(2) Date: Mar. 28, 2017

(87) PCT Pub. No.: WO2016/056219
PCT Pub. Date: Apr. 14, 2016

(65) Prior Publication Data
US 2017/0240730 A1    Aug. 24, 2017

(30) Foreign Application Priority Data
Oct. 7, 2014    (JP) .................................. 2014-206702

(51) Int. Cl.
*C08L 9/00* (2006.01)
*B65G 15/32* (2006.01)
*C08K 3/04* (2006.01)
*C08L 91/06* (2006.01)

(52) U.S. Cl.
CPC ............... *C08L 9/00* (2013.01); *B65G 15/32* (2013.01); *C08K 3/04* (2013.01); *C08L 91/06* (2013.01); *C08L 2201/02* (2013.01)

(58) Field of Classification Search
CPC ... B65G 15/32; C08L 7/00; C08L 9/00; C08L 91/06; C08L 2201/02; C08K 3/04; C08K 3/22; C08K 5/25
See application file for complete search history.

(56) References Cited

U.S. PATENT DOCUMENTS

| | | | | |
|---|---|---|---|---|
| 4,507,418 A * | 3/1985 | Utsunomiya | .......... | C08K 5/101 524/318 |
| 6,808,580 B2 * | 10/2004 | Allen | .................. | B29C 66/1142 156/157 |
| 7,939,175 B2 * | 5/2011 | Alexander | .............. | B32B 25/02 198/844.1 |
| 9,403,643 B2 * | 8/2016 | Sasakuma | ............ | C08K 5/0025 |
| 9,580,249 B2 * | 2/2017 | Si | ........................... | B65G 15/34 |
| 9,752,018 B2 * | 9/2017 | Sasakuma | ............. | B65G 15/32 |
| 2005/0250883 A1 * | 11/2005 | Shibata | ..................... | B60C 1/00 524/99 |
| 2014/0353129 A1 * | 12/2014 | Nakano | ................... | B65G 15/32 198/844.1 |
| 2015/0001047 A1 | 1/2015 | Nakano | | |

FOREIGN PATENT DOCUMENTS

| | | |
|---|---|---|
| CN | 101250289 A | 8/2008 |
| CN | 101875731 A | 11/2010 |
| CN | 102146172 A | 8/2011 |
| CN | 102718017 A | 10/2012 |
| CN | 103232621 A | 8/2013 |
| CN | 103665456 A | 3/2014 |
| CN | 104592579 A | 5/2015 |
| JP | H11171314 A | 6/1999 |
| JP | 2004091505 A | 3/2004 |
| JP | 2009298542 A | 12/2009 |
| JP | 2012092182 A | 5/2012 |
| JP | 2012180475 A * | 9/2012 |
| JP | 2012180475 A | 9/2012 |
| JP | 2013133190 A | 7/2013 |
| JP | 2014031248 A | 2/2014 |
| WO | WO-2013089069 A1 * | 6/2013 ............ B65G 15/32 |
| WO | 2013190976 A1 | 12/2013 |

OTHER PUBLICATIONS

Jan. 10, 2018, Search Result of Office Action issued by the State Intellectual Property Office in the corresponding Chinese Patent Application No. 201580054710.5.
Aug. 30, 2017, Search Result of Extended European Search Report issued by the European Patent Office in the corresponding European Patent Application No. 15849680.2.
Database WPI Week 200441 Thomson Scientific, London, GB; AN 2004-433337, XP002772680, 2004.
Database WPI Week 200914 Thomson Scientific, London, GB; AN 2009-B11477, XP002772679, 2009.
Database WPI Week 201353 Thomson Scientific, London, GB; AN 2012-R42439, XP002772677, 2013.
Database WPI Week 201425 Thomson Scientific, London, GB; AN 2013-U20848, XP002772678, 2014.
Database WPI Week 201553 Thomson Scientific, London, GB; AN 2015-41524L, XP002772681, 2015.

* cited by examiner

*Primary Examiner* — Gene O Crawford
*Assistant Examiner* — Keith R Campbell
(74) *Attorney, Agent, or Firm* — Kenja IP Law PC

(57) ABSTRACT

A rubber composition capable of forming a conveyor belt. The rubber composition for a conveyor belt contains: rubber components including natural rubber and butadiene rubber; a vulcanizing agent; a vulcanization accelerator; carbon black; chlorinated paraffin; and antimony trioxide. A mass ratio of content of the natural rubber to content of the butadiene rubber (natural rubber content:butadiene rubber content) is 25:75 to 45:55.

9 Claims, No Drawings

US 10,442,915 B2

RUBBER COMPOSITION FOR CONVEYOR BELT, AND CONVEYOR BELT

TECHNICAL FIELD

This disclosure relates to a rubber composition for a conveyor belt, and a conveyor belt.

BACKGROUND

Transporting equipment including a conveyor belt as a means for transporting items is used in various industrial fields such as the steel, coal, and cement industries. Such transporting equipment is commonly used in harsh environments and is often used to transport high-temperature articles. The conveyor belt of the transporting equipment is therefore required to have not only high strength as a rubber article, but also high flame retardance. On the other hand, there has recently been strong demand for transporting equipment having improved fuel efficiency, and thus there is need for a conveyor belt having an excellent low loss property.

The use of mainly natural rubber and styrene-butadiene rubber (SBR) as rubber components to provide a rubber article with high strength and flame retardance is a known technique. This technique is also applicable for conveyor belts. For example, PTL 1 discloses that by using mainly natural rubber and styrene-butadiene rubber as rubber components and by compounding a suitable flame retardant, a rubber composition for a conveyor belt having improved impact resistance can be obtained, while also ensuring flame retardance.

CITATION LIST

Patent Literature

PTL 1: JP 2012-180475 A

SUMMARY

Technical Problem

However, a conveyor belt produced using the rubber composition described above in which mainly natural rubber and styrene-butadiene rubber are used as rubber components suffers from a problem of having an inadequate low loss property. Therefore, there is still room for improvement in terms that it has not been possible to simultaneously provide a conveyer belt with high flame retardance, high strength, and a good low loss property.

Accordingly, an objective of this disclosure is to provide a rubber composition capable of forming a conveyor belt having an excellent low loss property, while also retaining high strength and high flame retardance as a rubber article, and also to provide a conveyor belt having an excellent low loss property, while also retaining high strength and high flame retardance as a rubber article.

Solution to Problem

Through diligent investigation conducted to achieve this objective, the inventors discovered that it is possible to obtain a rubber composition capable of forming a conveyor belt having an excellent low loss property, while retaining high flame retardance, by specifying the type and ratio of rubber components, and by compounding specific components.

Specifically, a rubber composition for a conveyor belt is disclosed herein that comprises: rubber components including natural rubber and butadiene rubber; a vulcanizing agent; a vulcanization accelerator; carbon black; chlorinated paraffin; and antimony trioxide, wherein a mass ratio of content of the natural rubber to content of the butadiene rubber (natural rubber content:butadiene rubber content) is 25:75 to 45:55.

Moreover, a conveyor belt is disclosed herein in which this rubber composition for a conveyor belt is used.

Advantageous Effect

According to this disclosure, it is possible to provide a rubber composition capable of forming a conveyor belt having an excellent low loss property, while also retaining high strength and high flame retardance as a rubber article, and it is also possible to provide a conveyor belt having an excellent low loss property, while also retaining high strength and high flame retardance as a rubber article.

DETAILED DESCRIPTION

The following provides a detailed description based on an embodiment.

A presently disclosed rubber composition for a conveyor belt contains at least: rubber components including natural rubber and butadiene rubber; a vulcanizing agent; a vulcanization accelerator; carbon black; chlorinated paraffin; and antimony trioxide, wherein a mass ratio of the content of the natural rubber to the content of the butadiene rubber (natural rubber content:butadiene rubber content) is 25:75 to 45:55.

(Rubber Components)

The presently disclosed rubber composition for a conveyor belt contains at least natural rubber and butadiene rubber as rubber components. The natural rubber can improve the fundamental mechanical properties of a conveyor belt, whereas the butadiene rubber can improve a low loss property of a conveyor belt. In the presently disclosed rubber composition for a conveyor belt, the mass ratio of the content of the natural rubber to the content of the butadiene rubber (natural rubber content:butadiene rubber content) is required to be 25:75 to 45:55. If this ratio is less than 25:75 (i.e., if the content of the natural rubber as a proportion of the total content of the natural rubber and the butadiene rubber is less than 25 mass %), it may not be possible to provide a conveyor belt with sufficient strength as a rubber article. On the other hand, if this ratio is greater than 45:55 (i.e., if the content of the natural rubber as a proportion of the total content of the natural rubber and the butadiene rubber is greater than 45 mass %), it may not be possible to provide a conveyor belt with an adequate low loss property. The ratio of the content of the natural rubber to the content of the butadiene rubber is more preferably 30:70 to 40:60 from a viewpoint of further improving the strength and low loss property of a conveyor belt.

The presently disclosed rubber composition for a conveyor belt may further contain rubber components other than the natural rubber and the butadiene rubber described above as necessary. Examples of other rubber components that can be used include diene-based rubber components such as isoprene rubber, styrene-butadiene rubber, chloroprene rubber, and acrylonitrile-butadiene rubber, and non-diene-based rubber components such as ethylene-propylene-diene copolymer, halogenated butyl rubber, and silicone rubber. One of these other rubber components may be used individually, or two or more of these other rubber components may be used in combination.

No specific limitations are placed on the total content of the natural rubber and the butadiene rubber among the rubber components of the presently disclosed rubber composition for a conveyor belt. However, from a viewpoint of sufficiently improving the strength and low loss property of a conveyor belt, the total content of the natural rubber and the butadiene rubber among the rubber components is preferably at least 90 mass %, more preferably at least 95 mass %, and particularly preferably 100 mass % (i.e., only natural rubber and butadiene rubber are contained as rubber components).

(Vulcanizing Agent)

The presently disclosed rubber composition for a conveyor belt at least contains a vulcanizing agent. The vulcanizing agent may be selected as appropriate depending on the objective without any specific limitations and may, for example, be a vulcanizing agent commonly used for rubber, such as a sulfur-based vulcanizing agent or an organic peroxide. Of these vulcanizing agents, sulfur-based vulcanizing agents are preferable as they enable effective, low-cost vulcanization. Examples of sulfur-based vulcanizing agents that can be used include powdered sulfur, highly dispersible sulfur, insoluble sulfur, and morpholine disulfide. Examples of organic peroxides that can be used include benzoyl peroxide, dicumyl peroxide, di-t-butyl peroxide, t-butyl cumyl peroxide, methyl ethyl ketone peroxide, cumene hydroperoxide, and 2,5-dimethyl-2,5-di(t-butylperoxy)hexane. One vulcanizing agent may be used individually, or two or more vulcanizing agents may be used in combination.

The content of the vulcanizing agent in the presently disclosed rubber composition for a conveyor belt may be selected as appropriate depending on the objective without any specific limitations. However, from a viewpoint of effectively ensuring strength as a rubber article (hereinafter, also referred to as "rubber strength") through the minimum amount of vulcanizing agent necessary, the content of the vulcanizing agent relative to 100 parts by mass of diene-based rubber components is preferably 0.1 parts by mass to 5 parts by mass, and more preferably 1 part by mass to 2 parts by mass.

(Vulcanization Accelerator)

The presently disclosed rubber composition for a conveyor belt at least contains a vulcanization accelerator. Examples of vulcanization accelerators that can be used include benzothiazole vulcanization accelerators such as 2-mercaptobenzothiazole, dibenzothiazyl disulfide, N-cyclohexyl-2-benzothiazolesulfenamide, and N-tert-butyl-2-benzothiazolesulfenamide, guanidine vulcanization accelerators such as 1,3-diphenyl guanidine, thiuram vulcanization accelerators such as tetramethylthiuram disulfide, tetraethylthiuram disulfide, tetrabutylthiuram disulfide, tetradodecylthiuram disulfide, tetraoctylthiuram disulfide, tetrabenzylthiuram disulfide, and dipentamethylenethiuram tetrasulfide, dithiocarbamates such as zinc dimethyldithiocarbamate, and zinc dialkyldithiophosphates. One vulcanization accelerator may be used individually, or two or more vulcanization accelerators may be used in combination.

The content of the vulcanization accelerator in the presently disclosed rubber composition for a conveyor belt may be selected as appropriate depending on the objective without any specific limitations. However, from a viewpoint of effectively accelerating vulcanization through the minimum amount of vulcanization accelerator necessary, the content of the vulcanization accelerator relative to 100 parts by mass of diene-based rubber components is preferably 0.1 parts by mass to 10 parts by mass, and more preferably 1 part by mass to 5 parts by mass.

(Carbon Black)

The presently disclosed rubber composition for a conveyor belt at least contains carbon black. The carbon black can contribute to improving the rubber strength and low loss property of a conveyor belt through mixing with diene-based rubber components and the like. The carbon black that is used may be selected as appropriate depending on the objective without any specific limitations and may, for example, be a type of carbon black commonly used for rubber such as channel black, furnace black, acetylene black, or thermal black.

The grade of the carbon black may be selected as appropriate depending on the objective without any specific limitations. For example, SAF-HS, SAF, ISAF-HS, ISAF, ISAF-LS, N285, N339, HAF-HS, HAF, or HAF-LS grade carbon black may be used. Of these grades of carbon black, ISAF grade carbon black or HAF grade carbon black is preferable from a viewpoint of sufficiently improving the rubber strength and low loss property of a conveyor belt. One type of carbon black may be used individually, or two or more types of carbon black may be used in combination.

Note that ISAF grade carbon black is carbon black having a nitrogen adsorption specific surface area ($N_2SA$) in a range of 117 $m^2/g$ to 150 $m^2/g$, whereas HAF grade carbon black is carbon black having a nitrogen adsorption specific surface area ($N_2SA$) in a range of 83 $m^2/g$ to 100 $m^2/g$.

The content of the carbon black in the presently disclosed rubber composition for a conveyor belt may be selected as appropriate depending on the objective without any specific limitations. However, the content of the carbon black relative to 100 parts by mass of diene-based rubber components is preferably 10 parts by mass to 100 parts by mass, more preferably 20 parts by mass to 70 parts by mass, and particularly preferably 40 parts by mass to 50 parts by mass. A carbon black content of at least 10 parts by mass relative to 100 parts by mass of diene-based rubber components enables sufficient improvement of the rubber strength, whereas a carbon black content of no greater than 100 parts by mass relative to 100 parts by mass of diene-based rubber components can prevent deterioration of the low loss property and ensure workability in kneading.

(Chlorinated Paraffin)

The presently disclosed rubber composition for a conveyor belt at least contains chlorinated paraffin. In this specification, the term "chlorinated paraffin" refers to a chain-shaped saturated hydrocarbon compound having an average carbon number of 26 in which some or all of the hydrogen atoms are substituted with chlorine atoms. The chlorinated paraffin contributes to improving the flame retardance of a conveyor belt, has appropriate viscosity, and causes aggregation of materials. As a result of the properties described above, compounding of the chlorinated paraffin has effects of improving flame retardance and formability of the resultant rubber composition and retaining a high level of rubber strength in a conveyor belt in which the rubber composition is used. Compounding of the chlorinated paraffin is particularly beneficial in the case of the presently disclosed rubber composition for a conveyor belt since the content of the natural rubber, which normally contributes to improving rubber strength, is low compared to the content of the butadiene rubber.

The chlorine content of the chlorinated paraffin may be selected as appropriate depending on the objective, but is preferably 65 mass % to 75 mass % from a viewpoint of ease of acquisition and improvement of flame retardance and rubber strength. The chlorinated paraffin may, for example, be "EMPARA 70" produced by Sanko Co. (chlorine content: 70 mass %). One type of chlorinated paraffin may be used individually, or two or more types of chlorinated paraffin may be used in combination.

The content of the chlorinated paraffin in the presently disclosed rubber composition for a conveyor belt may be selected as appropriate depending on the objective without any specific limitations. However, from a viewpoint of effectively and efficiently improving flame retardance and rubber strength, the content of the chlorinated paraffin relative to 100 parts by mass of the rubber components is preferably 5 parts by mass to 50 parts by mass, more preferably 5 parts by mass to 40 parts by mass, even more preferably 5 parts by mass to 30 parts by mass, particularly preferably 10 parts by mass to 30 parts by mass, and most preferably 15 parts by mass to 25 parts by mass. Setting the content of the chlorinated paraffin in the rubber composition for a conveyor belt as no greater than 40 parts by mass, and preferably no greater than 30 parts by mass, relative to 100 parts by mass of the rubber components has an effect of retaining high workability in terms of roll adhesion resistance and the like.

(Antimony Trioxide)

The presently disclosed rubber composition for a conveyor belt at least contains antimony trioxide. The antimony trioxide enables improvement of flame retardance of a conveyor belt. In particular, the antimony trioxide can effectively improve flame retardance through combined use with the chlorinated paraffin.

The antimony trioxide may, for example, be "PATOX-M" produced by Nihon Seiko Co., Ltd.

The content of the antimony trioxide in the rubber composition for a conveyor belt may be selected as appropriate depending on the objective without any specific limitations. However, from a viewpoint of effectively and efficiently improving flame retardance, the content of the antimony trioxide relative to 100 parts by mass of the rubber components is preferably 2 parts by mass to 20 parts by mass, more preferably 3 parts by mass to 10 parts by mass, and particularly preferably 4 parts by mass to 8 parts by mass.

Although the content of the antimony trioxide is not specifically limited, the content of the antimony trioxide as a proportion, by mass, relative to the content of the chlorinated paraffin (antimony trioxide content/chlorinated paraffin content) is preferably 0.15 to 0.30. This enables the effect of improved flame retardance through combined use of the chlorinated paraffin and the antimony trioxide to be obtained.

(Hydrazide Compound)

The presently disclosed rubber composition for a conveyor belt preferably further contains at least one type of hydrazide compound. The hydrazide compound acts as a dispersing aid for the carbon black in the rubber composition and can improve the low loss property of a conveyor belt.

The hydrazide compound is preferably naphthoic hydrazide or a derivative thereof from a viewpoint of further improving tensile strength of a conveyor belt and mill shrinkage resistance. Examples of the naphthoic hydrazide or derivative thereof include naphthoic hydrazide and derivatives thereof represented by the following formula (I):

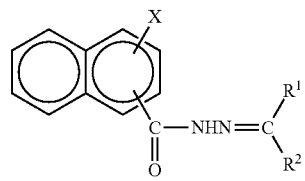

where, in formula (I), X represents a hydrogen atom, a hydroxy group, an amino group, or a group represented by the following formula (II):

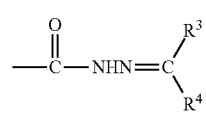

and $R^1$ to $R^4$ each represent, independently of one another, a hydrogen atom or a hydrocarbyl group having a carbon number of 1-18, where $R^1$ and $R^2$ may be bonded to one another to form a cyclic structure, and $R^3$ and $R^4$ may be bonded to one another to form a cyclic structure.

Examples of hydrocarbyl groups having a carbon number of 1-18 that may be represented by any of $R^1$ to $R^4$ in formulae (I) and (II) include linear and branched alkyl groups having a carbon number of 1-18, linear and branched alkenyl groups having a carbon number of 2-18, cycloalkyl groups having a carbon number of 3-18, aryl groups having a carbon number of 6-18, and aralkyl groups having a carbon number of 7-18. These cycloalkyl groups, aryl groups, and aralkyl groups may have an appropriate substituent, such as a lower alkyl group, a lower alkoxy group, an amino group, an alkyl-substituted amino group, or a hydroxy group, on the ring thereof. Examples of alkyl groups such as mentioned above include a methyl group, an ethyl group, an n-propyl group, an isopropyl group, an n-butyl group, an isobutyl group, a sec-butyl group, a tert-butyl group, a pentyl group, a hexyl group, an octyl group, and a decyl group. Examples of alkenyl groups such as mentioned above include a vinyl group, an allyl group, a propenyl group, a butenyl group, a hexenyl group, an octenyl group, and a decenyl group. Examples of cycloalkyl groups such as mentioned above include a cyclopentyl group, a cyclohexyl group, and a methylcyclohexyl group. Examples of aryl groups such as mentioned above include a phenyl group, a tolyl group, a xylyl group, a naphthyl group, and a methylnaphthyl group. Examples of aralkyl groups such as mentioned above include a benzyl group, a phenethyl group, and a naphthylmethyl group.

Suitable examples of the naphthoic hydrazide or derivative thereof represented by formula (I) include 1-hydroxy-N'-(1-methylethylidene)-2-naphthoic hydrazide, 1-hydroxy-N'-(1-methylpropylidene)-2-naphthoic hydrazide, 1-hydroxy-N'-(1-methylbutylidene)-2-naphthoic hydrazide, 1-hydroxy-N'-(1,3-dimethylbutylidene)-2-naphthoic hydrazide, 1-hydroxy-N'-(2,6-dimethyl-4-heptylidene)-2-naphthoic hydrazide, 3-hydroxy-N'-(1-methylethylidene)-2-naphthoic hydrazide, 3-hydroxy-N'-(1-methylpropylidene)-2-naphthoic hydrazide, 3-hydroxy-N'-(1-methylbutylidene)-2-naphthoic hydrazide, 3-hydroxy-N'-(1,3-dimethylbutylidene)-2-naphthoic hydrazide, 3-hydroxy-N'-(2,6-dimethyl-4-heptylidene)-2-naphthoic hydrazide, and 3-hydroxy-N'-(1,2-diphenylethylidene)-2-naphthoic hydrazide. Of these examples, 3-hydroxy-N'-(1-methylethylidene)-2-naphthoic hydrazide, 3-hydroxy-N'-(1-methylpropylidene)-2-naphthoic hydrazide, 3-hydroxy-N'-(1-methylbutylidene)-2-naphthoic hydrazide, 3-hydroxy-N'-(1,3-dimethylbutylidene)-2-naphthoic hydrazide, 3-hydroxy-N'-(2,6-dimethyl-4-heptylidene)-2-naphthoic hydrazide, 3-hydroxy-N'-(1,2-diphenylethylidene)-2-naphthoic hydrazide, and the like are more preferable from a viewpoint of effectively dispersing the carbon black and further improving the low loss property.

The content of the hydrazide compound in the rubber composition for a conveyor belt may be selected as appropriate depending on the objective without any specific limitations. However, from a viewpoint of sufficiently improving the low loss property of a conveyor belt and from a viewpoint of obtaining an effect of inhibiting shrinkage when a rolling operation is performed (i.e., improving mill shrinkage resistance), the content of the hydrazide compound relative to 100 parts by mass of the rubber components is preferably 0.1 parts by mass to 5 parts by mass. For the same reasons, the content of the hydrazide compound in the rubber composition for a conveyor belt relative to 100 parts by mass of the rubber components is more preferably 0.1 parts by mass to 3 parts by mass, and even more preferably 0.5 parts by mass to 3 parts by mass.

It is particularly preferable that in the rubber composition for a conveyor belt, the content of the chlorinated paraffin relative to 100 parts by mass of the rubber components is 10 parts by mass to 30 parts by mass and the content of the hydrazide compound relative to 100 parts by mass of the rubber components is 0.5 parts by mass to 3 parts by mass. Through adjustment of the contents of the chlorinated paraffin and the hydrazide compound as described above, good strength, flame retardance, and low loss property can be obtained while also synergistically enhancing workability from refining through to rolling (mill shrinkage resistance and roll adhesion resistance).

It is preferable that in the rubber composition for a conveyor belt, the content of the hydrazide compound as a proportion, by mass, relative to the content of the chlorinated paraffin (hydrazide compound content/chlorinated paraffin content) is 0.005 to 0.25. This enables a favorable balance of good strength, flame retardance, low loss property, mill shrinkage resistance, and roll adhesion resistance.

(Other Components)

The presently disclosed rubber composition for a conveyor belt may further contain additives and the like other than the components described above as necessary. Examples of additives that can be used include vulcanization accelerator aids, retarders (anti-scorch agents), reinforcing fillers other than carbon black, age resistors, plasticizers, waxes, antioxidants, lubricants, ultraviolet absorbing agents, dispersants, compatibilizing agents, and homogenizing agents.

(Rubber Composition for Conveyor Belt)

The presently disclosed rubber composition for a conveyor belt can be produced by, for example, kneading the components described above using a kneading device such as an open mixing-type roll mill or a closed mixing-type Banbury mixer, Brabender mixer, or kneader.

A loss index ($\tan \delta / E'^{1/3}$) of the presently disclosed rubber composition for a conveyor belt, calculated from the storage modulus (E') and the loss tangent tan δ at a strain of 2%, a frequency of 10 Hz, and a temperature of 20° C., is preferably no greater than 0.110, more preferably no greater than 0.100, and even more preferably no greater than 0.097. When the loss index of the rubber composition for a conveyor belt is no greater than 0.110, a conveyor belt having an even better low loss property can be produced.

The loss index can be adjusted, for example, by appropriately altering, within the scope of this disclosure, the ratio of contents of the natural rubber and the butadiene rubber in the rubber composition for a conveyor belt, and the content of the carbon black, or a reinforcing filler other than the carbon black, in the rubber composition for a conveyor belt.

The tensile strength (Tb) of the presently disclosed rubber composition for a conveyor belt, as measured in accordance with JIS K 6251, is preferably at least 14.0 MPa, more preferably at least 15.0 MPa, and even more preferably at least 15.5 MPa. When the rubber composition for a conveyor belt has a tensile strength (Tb) of at least 14.0 MPa, a conveyor belt having sufficiently high rubber strength can be produced.

The tensile strength (Tb) can be adjusted, for example, by appropriately altering, within the scope of this disclosure, the ratio of contents of the natural rubber and the butadiene rubber in the rubber composition for a conveyor belt, and the contents of the carbon black and the chlorinated paraffin in the rubber composition for a conveyor belt.

(Conveyor Belt)

A presently disclosed conveyor belt is obtained using the composition for a conveyor belt described above. In one embodiment, the rubber composition for a conveyor belt may be used in the conveyor belt for at least inner circumference surface rubber (lower surface cover rubber) that is below a reinforcing member formed by steel cord or the like and in contact with a drive pulley, a driven pulley, a shape retention rotor, or the like, and may also be used for outer circumference surface rubber (upper surface cover rubber) that is above the reinforcing member and in contact with transported items. The presently disclosed conveyor belt has an excellent low loss property while also retaining high flame retardance and rubber strength as a result of the previously described rubber composition for a conveyor belt being used therein.

In one specific example of production of the presently disclosed conveyor belt, a reinforcing member is sandwiched between sheets made of the rubber composition, and the rubber composition is subjected to thermocompression bonding and vulcanization adhesion to adhere the rubber composition to the reinforcing member and cover the reinforcing member with the rubber composition. Although the vulcanization conditions used in this method may be selected as appropriate, normally a vulcanization temperature of 140° C. to 170° C. and a vulcanization time of 10 minutes to 80 minutes are preferable.

The presently disclosed conveyor belt can be used in production of transporting equipment. The transporting equipment has an excellent low loss property while also retaining high flame retardance and rubber strength as a consequence of the presently disclosed conveyor belt being used therein. The presently disclosed conveyor belt can be adopted in any transporting equipment and is particularly suitable for use in, for example, transporting equipment used in a high-temperature environment or transporting equipment for transportation of high-temperature items.

EXAMPLES

The following provides a more detailed description through examples which include both prophetic and working examples. However, this disclosure is not in any way limited by the following examples and appropriate alterations may be made without deviating from the essence of the disclosure.

Unvulcanized rubber compositions with the formulations shown in Table 1 (units: parts by mass) are/were prepared using a 1700 mL Banbury mixer. Each of the unvulcanized rubber compositions is/was vulcanized for 15 minutes at 160° C. to produce a vulcanized rubber composition. The following methods are/were used to evaluate the tensile strength, loss index, flame retardance, roll adhesion resistance, and mill shrinkage resistance of the vulcanized rubber compositions. The results are shown in Table 1.

(Tensile Strength (Tb))

The tensile strength (MPa) is/was determined in accordance with JIS K 6251. The results are shown in Table 1. A higher value indicates better rubber strength. Specifically, a value of at least 14.0 MPa is preferable.

(Loss Index)

A viscoelasticity meter produced by Rheometrics Inc. is/was used to measure the storage modulus (E') and the loss tangent tan δ at a temperature of 20° C., a strain of 2%, and a frequency of 10 Hz. The measured values are/were then used to calculate the loss index (tan $\delta/E'^{1/3}$). The results are shown in Table 1. A smaller value indicates a better low loss property. Specifically, a value of no greater than 0.110 is preferable.

(Flame Retardance)

A test is/was conducted in accordance with the test method of the JIS three-level flame retardance test (JIS K 6324:2000). The flame retardance is/was evaluated based on the measured flame duration using the following five grades. The results are shown in Table 1.

5: Flame duration of no longer than 10 s
4: Flame duration of longer than 10 s and no longer than 25 s
3: Flame duration of longer than 25 s and no longer than 40 s
2: Flame duration of longer than 40 s and no longer than 60 s (level 3 pass)
1: Flame duration of longer than 60 s (level 3 fail)

(Roll Adhesion Resistance)

Rolling is/was performed under conditions of a 6 inch roll size, a 2 mm gauge, a 20 rpm front roll speed, and an 18 rpm back roll speed. Roll adhesion resistance was evaluated using the following five grades. The results are shown in Table 1.

5: Sample displays almost no adhesion to roll (extremely good workability)
4: Sample displays slight adhesion to roll but can be worked easily (very good workability)
3: Sample displays some adhesion to roll but can be worked relatively easily (good workability)
2: Sample displays strong adhesion to roll but can be peeled off (workable)
1: Sample displays very strong adhesion to roll and cannot be peeled off (unworkable)

(Mill Shrinkage Resistance)

Rolling is/was performed under conditions of a 6 inch roll size, a 2 mm gauge, a 20 rpm front roll speed, and an 18 rpm back roll speed. Next, sufficient warming is/was performed and the rolls were stopped. A 5 cm square is/was punched out from the rolled sheet with the sheet still stretched across the rolls. The rate of dimensional change in the sheet rolling direction after punching out is/was measured and mill shrinkage resistance was evaluated using the following five grades. The results are shown in Table 1.

5: Rate of dimensional change of less than 40%
4: Rate of dimensional change of at least 40% and less than 50%
3: Rate of dimensional change of at least 50% and less than 60%
2: Rate of dimensional change of at least 60% and less than 70%
1: Rate of dimensional change of at least 70%

TABLE 1

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|---|---|---|
| Natural rubber | 25 | 30 | 35 | 35 | 35 | 35 | 40 | 45 | 40 | 40 | 40 | 40 | 40 | 40 | 40 |
| Styrene-butadiene rubber *1 | 0 | 0 | 0 | 0 | 0 | 0 | 0 | 0 | 0 | 0 | 0 | 0 | 0 | 0 | 0 |
| Butadiene rubber *2 | 75 | 70 | 65 | 65 | 65 | 65 | 60 | 55 | 60 | 60 | 60 | 60 | 60 | 60 | 60 |
| Chlorinated paraffin *3 | 20 | 20 | 20 | 20 | 20 | 20 | 20 | 20 | 5 | 10 | 30 | 40 | 50 | 20 | 20 |
| Antimony trioxide *4 | 5 | 5 | 5 | 5 | 5 | 5 | 5 | 5 | 1 | 2.5 | 7.5 | 10 | 12.5 | 5 | 5 |
| Hydrazide compound A *5 | 1 | 1 | 1 | 1 | 1 | 1 | 1 | 1 | 1 | 1 | 1 | 1 | 1 | 0.1 | 0.5 |
| Hydrazide compound B *6 | 0 | 0 | 0 | 0 | 0 | 0 | 0 | 0 | 0 | 0 | 0 | 0 | 0 | 0 | 0 |
| Carbon black *7 | 50 | 50 | 40 | 45 | 50 | 55 | 50 | 50 | 50 | 50 | 50 | 50 | 50 | 50 | 50 |
| Vulcanizing agent *8 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator A *9 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerator B *10 | 1 | 1 | 1 | 1 | 1 | 1 | 1 | 1 | 1 | 1 | 1 | 1 | 1 | 1 | 1 |
| Content of hydrazide compound as proportion, by mass, relative to content of chlorinated paraffin | 0.05 | 0.05 | 0.05 | 0.05 | 0.05 | 0.05 | 0.05 | 0.05 | 0.20 | 0.10 | 0.033 | 0.025 | 0.020 | 0.005 | 0.025 |
| Tensile strength Tb (MPa) | 14.1 | 15.5 | 15.9 | 16.7 | 17.3 | 18.0 | 19.2 | 19.3 | 17.1 | 17.0 | 16.5 | 15.8 | 15.0 | 20.2 | 20.3 |
| Loss index | 0.084 | 0.090 | 0.092 | 0.097 | 0.103 | 0.102 | 0.105 | 0.108 | 0.085 | 0.088 | 0.101 | 0.109 | 0.122 | 0.110 | 0.106 |
| Flame retardance | 4 | 4 | 3 | 4 | 4 | 4 | 4 | 4 | 2 | 3 | 4 | 5 | 5 | 4 | 4 |
| Roll adhesion resistance | 4 | 4 | 3 | 3 | 3 | 3 | 3 | 3 | 4 | 3 | 3 | 2 | 2 | 3 | 3 |
| Mill shrinkage resistance | 4 | 4 | 3 | 3 | 3 | 4 | 3 | 3 | 3 | 4 | 4 | 5 | 5 | 4 | 4 |

TABLE 1-continued

| | Example 16 | Example 17 | Example 18 | Example 19 | Example 20 | Example 21 | Example 22 | Example 23 | Example 24 | Example 25 | Comparative Example 1 | Comparative Example 2 | Comparative Example 3 | Comparative Example 4 |
|---|---|---|---|---|---|---|---|---|---|---|---|---|---|---|
| Natural rubber | 40 | 40 | 40 | 40 | 40 | 40 | 40 | 40 | 40 | 40 | 60 | 60 | 20 | 50 |
| Styrene-butadiene rubber *1 | 0 | 0 | 0 | 0 | 0 | 0 | 0 | 0 | 0 | 0 | 25 | 25 | 0 | 0 |
| Butadiene rubber *2 | 60 | 60 | 60 | 60 | 60 | 60 | 60 | 60 | 60 | 60 | 15 | 15 | 80 | 50 |
| Chlorinated paraffin *3 | 20 | 20 | 20 | 20 | 20 | 20 | 30 | 20 | 20 | 20 | 20 | 0 | 20 | 20 |
| Antimony trioxide *4 | 5 | 5 | 5 | 5 | 5 | 5 | 7.5 | 5 | 5 | 5 | 5 | 1 | 5 | 5 |
| Hydrazide compound A *5 | 1.5 | 3 | 5 | 10 | 0 | 0.5 | 3 | 5 | 5 | 1 | 0 | 0 | 1 | 1 |
| Hydrazide compound B *6 | 0 | 0 | 0 | 0 | 1 | 0.5 | 0 | 0 | 0 | 0 | 0 | 0 | 0 | 0 |
| Carbon black *7 | 50 | 50 | 50 | 50 | 50 | 50 | 50 | 40 | 55 | 60 | 55 | 55 | 50 | 50 |
| Vulcanizing agent *8 | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator A *9 | 0.5 | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerator B *10 | 1 | 1 | 1 | 1 | 1 | 1 | 1 | 1 | 1 | 1 | 1 | 1 | 1 | 1 |
| Content of hydrazide compound as proportion, by mass, relative to content of chlorinated paraffin | 0.075 | 0.15 | 0.25 | 0.50 | 0.05 | 0.05 | 0.10 | 0.05 | 0.05 | 0.05 | 0 | — | 0.05 | 0.05 |
| Tensile strength Tb (MPa) | 19.4 | 17.8 | 16.1 | 14.5 | 17.8 | 18.4 | 16.9 | 16.2 | 19.0 | 18.8 | 22.1 | 23.4 | 12.8 | 20.0 |
| Loss index | 0.096 | 0.089 | 0.071 | 0.066 | 0.099 | 0.102 | 0.100 | 0.094 | 0.110 | 0.124 | 0.168 | 0.155 | 0.081 | 0.121 |
| Flame retardance | 4 | 4 | 4 | 4 | 4 | 4 | 4 | 3 | 4 | 4 | 4 | 1 | 4 | 4 |
| Roll adhesion resistance | 3 | 3 | 3 | 3 | 3 | 3 | 3 | 3 | 3 | 3 | 3 | 4 | 4 | 3 |
| Mill shrinkage resistance | 3 | 2 | 2 | 1 | 2 | 2 | 3 | 3 | 4 | 4 | 4 | 2 | 4 | 3 |

*1 Styrene-butadiene rubber: "JSR 1500" produced by JSR Corporation
*2 Butadiene rubber: "BR01" produced by JSR Corporation
*3 Chlorinated paraffin: "EMPARA 70" produced by Sanko Co. (chlorine content: 70 mass %)
*4 Antimony trioxide: "PATOX-M" produced by Nihon Seiko Co., Ltd.
*5 Hydrazide compound A: "BMH" produced by Otsuka Chemical Co., Ltd., 3-hydroxy-N'-(1,3-dimethylbutylidene)-2-naphthoic hydrazide
*6 Hydrazide compound B: "IDH-S" produced by Otsuka Chemical Co., Ltd., isophthalic dihydrazide
*7 Carbon black: "N330" produced by Tokai Carbon Co., Ltd., HAF grade furnace black
*8 Vulcanizing agent: "SULFAX 5" produced by Tsurumi Chemical Industry Co., Ltd., sulfur
*9 Vulcanization accelerator A: "NOCCELER D" produced by Ouchi Shinko Chemical Industrial Co., Ltd., 1,3-diphenyl guanidine
*10 Vulcanization accelerator B: "SANCELER CM" produced by Sanshin Chemical Industry Co., Ltd., N-cyclohexyl-2-benzothiazolesulfenamide The results in Table 1 demonstrate that a conveyor belt having an excellent low loss property can be obtained, while also retaining high strength and flame retardance as a rubber article, through use of the presently disclosed rubber composition for a conveyor belt containing: rubber components including natural rubber and butadiene rubber; a vulcanizing agent; a vulcanization accelerator; carbon black; chlorinated paraffin; and antimony trioxide, wherein the mass ratio of the content of the natural rubber to the content of the butadiene rubber (natural rubber content:butadiene rubber content) is 25:75 to 45:55.

Furthermore, the results in Table 1 also demonstrate that through adjustment of the content of the chlorinated paraffin and the content of a hydrazide compound, mill shrinkage resistance and roll adhesion resistance can be synergistically enhanced, while also enabling good strength, flame retardance, and low loss property to be obtained.

The invention claimed is:

1. A rubber composition for a conveyor belt comprising: rubber components including natural rubber and butadiene rubber; a vulcanizing agent; a vulcanization accelerator; carbon black; chlorinated paraffin; antimony trioxide, and at least one hydrazide compound, wherein a mass ratio of content of the natural rubber to content of the butadiene rubber is from 25:75 to 45:55, and content of the hydrazide compound as a proportion, by mass, relative to content of the chlorinated paraffin is 0.005 to 0.25.

2. The rubber composition for a conveyor belt of claim 1, wherein
the hydrazide compound is naphthoic hydrazide or a derivative thereof.

3. The rubber composition for a conveyor belt of claim 1, wherein
the chlorinated paraffin has a content of 5 parts by mass to 50 parts by mass relative to 100 parts by mass of the rubber components.

4. The rubber composition for a conveyor belt of claim 1, wherein
the hydrazide compound has a content of 0.1 parts by mass to 5 parts by mass relative to 100 parts by mass of the rubber components.

5. The rubber composition for a conveyor belt of claim 1, wherein
the chlorinated paraffin has a content of 10 parts by mass to 30 parts by mass relative to 100 parts by mass of the rubber components and the hydrazide compound has a content of 0.5 parts by mass to 3 parts by mass relative to 100 parts by mass of the rubber components.

6. The rubber composition for a conveyor belt of claim 1 having a loss index of no greater than 0.110, the loss index being calculated from a storage modulus (E') and a loss tangent tan δ at a strain of 2%, a frequency of 10 Hz, and a temperature of 20° C. according to: loss index=$\tan \delta / E'^{1/3}$.

7. The rubber composition for a conveyor belt of claim 1 having a tensile strength (Tb) of at least 14.0 MPa as measured in accordance with JIS K 6251.

8. A conveyor belt in which the rubber composition for a conveyor belt of claim 1 is used.

9. The rubber composition for a conveyor belt of claim 1, wherein a total content of the natural rubber and the butadiene rubber among the rubber composition is at least 90 mass %.